United States Patent [19]

Robertson et al.

[11] Patent Number: 5,491,636
[45] Date of Patent: Feb. 13, 1996

[54] ANCHORLESS BOAT POSITIONING EMPLOYING GLOBAL POSITIONING SYSTEM

[75] Inventors: Glen E. Robertson, 1304 S. Orange Ave., Sarasota, Fla. 34239; John L. Webster, Huntsville, Ala.

[73] Assignee: Glen E. Robertson, Sarasota, Fla.

[21] Appl. No.: 229,512

[22] Filed: Apr. 19, 1994

[51] Int. Cl.$^6$ ............... G06F 165/00; B63H 21/22
[52] U.S. Cl. ............... 364/432; 364/449; 364/457; 342/357; 440/1; 114/144 B
[58] Field of Search ............... 364/432, 449, 364/460, 462, 457, 444, 458; 342/357, 450, 451; 340/986; 440/1; 114/144 A, 144 B

[56] References Cited

U.S. PATENT DOCUMENTS

| | | | |
|---|---|---|---|
| 3,280,311 | 10/1966 | Shatto, Jr. et al. | 364/432 |
| 3,500,025 | 3/1970 | Moulin et al. | 364/432 |
| 3,508,512 | 4/1970 | Desrayaud et al. | 364/432 X |
| 3,965,840 | 6/1976 | Blumberg | 114/144 B |
| 4,205,379 | 5/1980 | Fox et al. | 364/432 |
| 4,316,253 | 2/1982 | Posseme | 364/432 |
| 4,487,149 | 12/1984 | Morris | 114/144 E |
| 4,645,141 | 2/1987 | McElreath | 364/432 X |
| 4,747,359 | 5/1988 | Ueno | 114/144 B |
| 4,968,981 | 11/1990 | Sekine et al. | 364/432 X |
| 5,172,324 | 12/1992 | Knight | 364/457 |
| 5,179,519 | 1/1993 | Adachi et al. | 364/449 |
| 5,185,761 | 2/1993 | Kawasaki | 342/357 X |
| 5,202,829 | 4/1993 | Geier | 364/449 |
| 5,225,842 | 7/1993 | Brown et al. | 342/357 |
| 5,363,307 | 11/1994 | Yoshida | 364/452 |
| 5,386,368 | 1/1995 | Knight | 364/432 |

OTHER PUBLICATIONS

Harris et al.; *GPS Technology and Opportunities;* Expo Comm China '92; Beijing, China; Oct. 30–Nov. 4, 1992.

*Primary Examiner*—Michael Zanelli
*Attorney, Agent, or Firm*—Fish & Richardson

[57] ABSTRACT

An anchorless boat positioning system dynamically and automatically maintains a boat at a selected anchoring location within water without the use of a conventional anchor by using a steerable thruster whose thrust and steering direction are determined on the basis of position information signals received from global positioning system (GPS) satellites and heading indication signals from a magnetic compass. The anchorless positioning system continuously monitors the position and heading of the boat and compares it with the stored coordinates of the selected anchoring location to generate control signals for the steerable motor.

12 Claims, 6 Drawing Sheets

Microfiche Appendix Included
(1 Microfiche, 40 Pages)

ANCHORLESS BOAT POSITIONING EMPLOYING GLOBAL POSITIONING SYSTEM

REFERENCE TO MICROFICHE APPENDIX

A microfiche appendix is attached to this application. The appendix, which includes source code software for implementing the anchorless boat positioning system, includes 40 frames on 1 microfiche.

BACKGROUND OF THE INVENTION

This invention relates to an anchorless boat positioning system.

Boat anchors have been used for thousands of years. The anchor is attached to the boat with a line or "rode" and then lowered overboard so that the flukes of the anchor dig into the water bottom. Problems exist, however, in using anchors in certain settings. The depth of the water may prohibit anchoring because the length of line needed to reach the water bottom is impractical. Moreover, even if the anchor reaches the water bottom, the depth of the water may be so great that it becomes difficult to maintain the anchored boat within close proximity to a desired position when varying wind or water currents are present. The line from the boat to the anchor acts as a tether allowing the boat, subject to the current and wind, to swing about an arc whose radius is nearly that of the length of the anchor line. In small craft, manually lowering and raising a conventional anchor is also strenuous and time consuming, plus there is always the possibility of the anchor becoming "fouled" on the bottom, a common aggravation for the skipper.

Further, the use of anchors may be restricted in waters where, for example, underwater cabling has been installed (usually indicated on navigational charts) or where a salvage operation is taking place. The use of anchors which dig and plow has also come under criticism for causing severe damage to fragile underwater ecosystems. For example, anchors of fishing vessels have caused significant damage to long standing coral reefs, resulting in these areas being designated as "No Anchoring" areas.

SUMMARY OF THE INVENTION

The invention allows a boat to be dynamically and automatically held in position at a selected anchoring location on the water without the use of a conventional anchor, line, or winch by controlling the thrust and steering of a thruster (e.g., trolling motor) attached to the boat. The thruster is controlled on the basis of signals received from global positioning system (GPS) satellites orbiting the earth and a digital magnetic compass mounted on the thruster. The signals from the GPS satellites provide an ongoing indication of the position of the boat in earth positional coordinates while the compass provides continuous heading indications of the thruster. With this information, a controller compares the positional coordinates of the selected anchoring location with the positional coordinates of the boat's current location and generates steering and thrust signals to the thruster to move the boat to the anchoring site.

The global positioning system, available for use by both civilians and the military, is a multiple-satellite based radio positioning system, placed into orbit by The United States of America Department of Defense, in which each GPS satellite transmits data that allows a user to precisely measure the distance from selected ones of the GPS satellites to his antenna and to thereafter compute position, velocity, and time parameters to a high degree of accuracy, using known triangulation techniques. The signals provided by the GPS can be received worldwide twenty-four hours a day. The accuracy in determining the earth positional coordinates may be augmented through the use of a differential reference station for providing differential correction information (DGPS mode) to the receiver.

In one general aspect of the invention, an anchorless boat positioning system for substantially maintaining the position of a boat at a desired location includes one or more thrusters attached to the boat for moving the boat to the selected location within the water, a GPS receiver receiving signals from GPS satellites for providing position information signals indicative of the position of the boat, a magnetic compass for providing a heading indication signal representative of the direction the thruster is pointed, and a controller (e.g., computer) for providing control signals to control the magnitude and direction of the thrust on the basis of the position information signals from the GPS receiver and the heading indication signal from the magnetic compass.

Embodiments of the invention may include one or more of the following features. The control signals are based on the range, rate of change in range, and bearing from the present location of the boat to the selected anchoring location. A single thruster, fully rotatable about a vertical axis extending from above the surface of the water to below the surface of the water and transverse to the direction of propulsion of the thruster, is used to maintain the position of the boat. The control signals include thrust control signals for varying the amount of thrust generated by the thruster and steering control signals for controlling the direction of the thruster is pointing. The thruster is typically attached to the bow of the boat. The anchorless positioning system may include a GPS reference receiver positioned at a known location different from the position of the GPS receiver aboard the boat, with the GPS receiver on board the boat receiving signals from both the GPS reference receiver and the GPS satellites to provide position information signals in differential GPS mode, a technique for improving the accuracy in determining earth positional coordinates. The magnetic compass provides a heading indication signal representative of the heading of the thruster. The control signals relate to the difference between a present position and a selected location.

A first non-rotatable thruster may be used for providing thrust in a direction along a long axis of the boat and a second non-rotatable thruster for providing thrust in a direction transverse to that of the first non-rotatable thruster may be used to maintain the heading of the boat toward the selected anchor location. The controller provides thrust control signals to the first non-rotatable thruster and steering control signals to the second non-rotatable thruster. An additional thruster may be positioned at the stern of the boat to assist in propelling the boat in the direction of the boat's heading.

In another aspect of the invention a method of substantially maintaining a position of a boat at a selected location in water includes receiving and storing position information signals from GPS satellites with a GPS receiver to establish positional coordinates of a selected anchoring location; receiving, after a predetermined period of time, position information signals from the GPS satellites with the GPS receiver to determine a present location of the boat and a present heading indication of the thruster from the magnetic compass; and controlling the magnitude and direction of the thrust of at least one thruster on the basis of the difference between the positional coordinates of the anchoring location and the present location.

The method may also include one or more of the following steps. Controlling the thruster includes determining the range, rate of change in the range, and bearing from the present location of the boat to the preselected anchoring location. A separate magnetic compass may be used to provide a heading indication of the boat, independent to that of the heading of the thruster, at the selected anchoring location, for maintaining the heading of the boat at the selected anchoring location. The method may also include receiving position correcting information signals from various sources including a reference GPS receiver positioned at a known location different from the position of the boat.

In operation, the boat operator, upon reaching a desired location, merely presses a button on the console of the boat to establish the anchoring site coordinates. A receiver positioned on board the boat receives signals from GPS satellites orbiting the earth to accurately provide the latitude and longitude of the desired location. The differential GPS reference station may be located at a surveyed shore site. A controller uses the signals from the receiver and the reference station in conjunction with signals from a heading indicating compass mounted on the thruster, to generate control signals to point the thruster so that the boat maintains its position over the desired location until the operator decides to move on.

The use of the GPS system has advantages not seen with other radio navigation systems. For example, the LORAN land-based system is generally only effective for maritime applications where operation is along the coastline. Further, the LORAN system is subject to the errors caused by land masses and weather disturbances. The GPS system is the only source of accurate geographical position information having submeter accuracy and providing worldwide coverage to users. In fact, more recently, commercial services have become available for providing DGPS mode of operation to civilian users in areas remote from offshore reference stations. These commercial services use satellites (not part of the GPS system) to provide, at a price, differential correction signals from their satellites to improve the user's resolution in positioning.

Although the system is generally intended for short duration situations (e.g., a few hours) the system may be used for longer periods while being properly monitored. Moreover, the anchorless boat positioning system may be used to complement good anchoring devices and practices. For example, in extreme weather and/or current conditions a conventional anchor may be required to maintain the position of the boat.

Other advantages and features of the invention will be apparent from the following description and from the claims.

DESCRIPTION OF THE PREFERRED EMBODIMENTS

Figure 1:
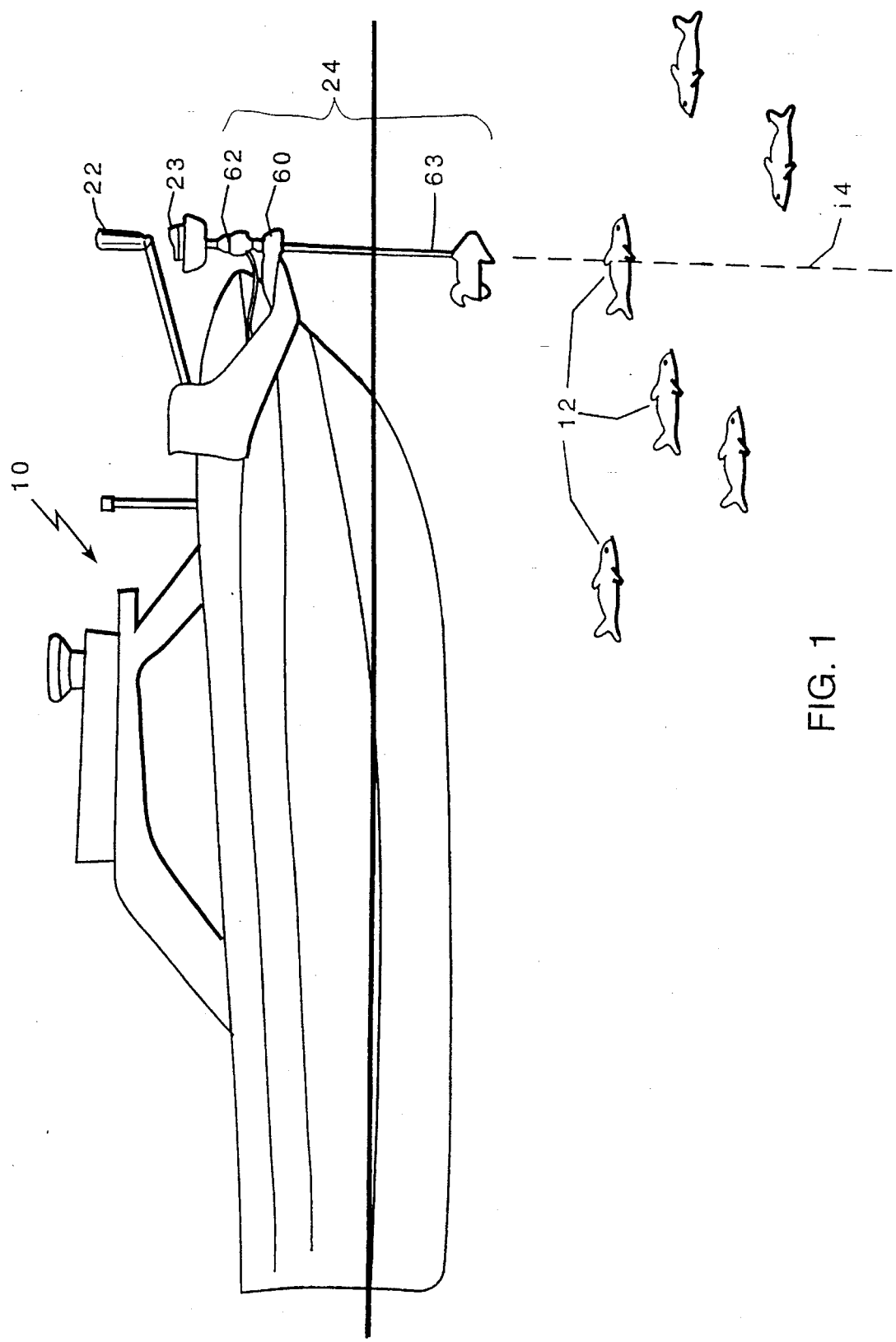
FIG. 1 is a diagrammatic view of a boat having a thruster positioning motor mounted to the bow of the boat.

Referring to FIG. 1, a boat 10 is shown positioned over a school of fish 12, located, perhaps, using known fish-finding equipment aboard the boat. The operator of the boat, desiring to maintain this favorable fishing location 14 (designated by dashed line), effectively "anchors" the boat by pressing a button located on the operator console. The anchorless positioning system 20 (FIG. 2) determines the earth positional coordinates of the selected location from global positioning system signals received by a GPS antenna 22 and stores the coordinates. As the boat begins to drift from location 14 (FIG. 4), the anchorless positioning system continuously receives positional information from receiver 26 (FIG. 2) and heading information from digital compass 23 to generate signals for controlling the thrust and direction of thruster 24 to maintain the bow of the boat at essentially location 14.

Trolling motor 24 is preferably mounted at the bow of boat 10 which generally has a more streamlined and contoured design for minimizing resistance as it moves through the water. Thus, when anchored at the bow, the boat is more easily aligned with forces caused by changing currents and winds and can better deflect these disturbing forces. Moreover, the stern of the boat is left free for other activities (e.g., fishing, working, or diving) by the operators and passengers.

Figure 2:
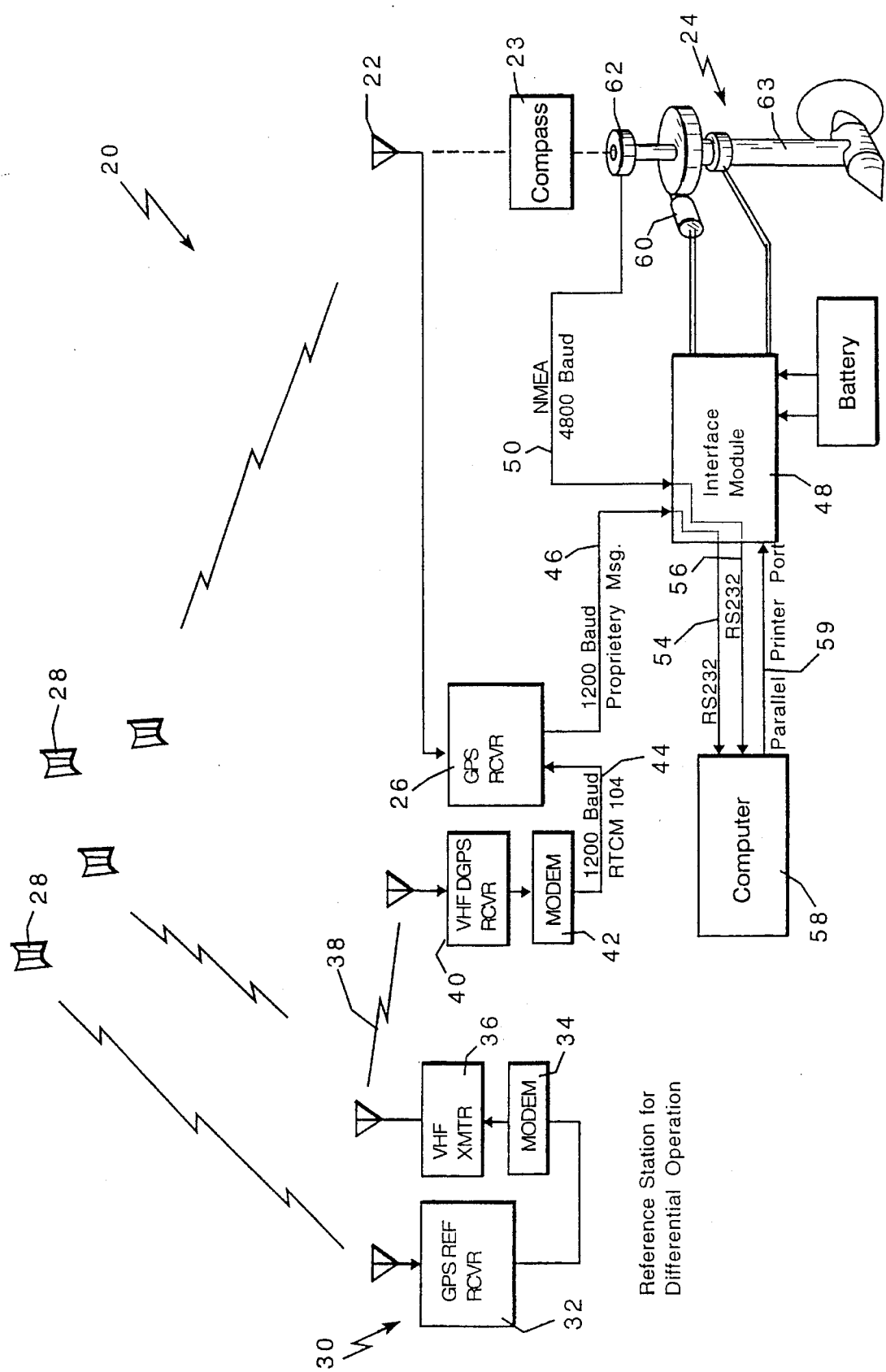
FIG. 2 is a block diagram illustrating the primary components of the anchorless boat positioning system.

Referring to the block diagram of FIG. 2, the anchorless positioning system 20 includes a differential global positioning satellite (DGPS) receiver 26 located aboard boat 10 for receiving, with antenna 22, coarse acquisition code (C/A-code) signals transmitted at a frequency of 1575.42 MHz from orbiting GPS satellites 28. C/A-code is also often referred to as civilian accuracy code to distinguish it from the longer P-code which provides higher position resolution but is restricted for use by the Department of Defense. Receiver 26 is a Model XR-4G Ver. 2.15 receiver, manufactured by Navstar Ltd., Daventry, Northants, England. The navigation processing and memory functions performed by DGPS receiver 26 include satellite orbit calculations and satellite selection, atmospheric delay correction calculations, navigation solution computation, clock bias and rate estimates, computation of output information, and coordinate conversion of the position information.

The accuracy in calculating the position, time and velocity parameters by receiver 26 is significantly improved using differential GPS (DGPS) techniques. This technique involves the use of a DGPS reference station 30 operating at a surveyed location, generally onshore. Reference station 30 includes a DGPS reference receiver 32, which may be of the same type as receiver 26, for receiving signals from satellites 28 and computing satellite pseudo range correction data using prior knowledge of the correct satellite pseudo ranges. The satellite pseudo range correction data is converted to radio frequency shift modulated signals with reference station modem 34 and then broadcast to users within communication range in the same geographic area with transmitter 36 over a radio digital data link 38. The radio frequency shift modulated signals are in the HF, VHF or UHF frequency bands. The pseudo range corrections are received by a radio frequency receiver 40 aboard boat 10 and demodulated with modem 42 as digital data. The digital data is provided to DGPS receiver 26 over a data line 44 (1200–9600 baud) in Radio Technical Committee Maritime format (RTCM 104) for incorporation into the calculation of the navigation solution and to correct for the observed satellite pseudo range measurements, thereby improving the accuracy of the position determination to within 2–5 meters or better.

The accuracy of the position determination is on the order of 2 to 5 meters for the initial embodiment and can be sub-meter with more sophisticated DGPS receivers. Correlation of the errors experienced at reference station 30 and at the user location 14 is minimal for a user within 100 kilometers of the reference station.

Another factor affecting the accuracy of the computed position and velocity parameters is the positional geometry of the satellites selected for measurement of ranges. Generally, the best position solution is obtained using satellites having wide angles of separation. One satellite near the zenith with three others just above the horizon at a 120 degree azimuth separation generally provide the best achievable satellite geometry.

DGPS receiver 26 includes an RF assembly for mixing the 1575.42 MHz GPS signal down to a convenient IF frequency and then, using techniques well known in the art, tracking the pseudo random code (PRN) used to modulate the signal through code-correlation to measure the time of transmission of the signals from the satellite. The signal may also be measured through a carrier tracking loop. Combined code correlation and carrier tracking function can be performed using either analog or digital processing.

The control of the code and carrier tracking loops is provided by a DGPS processor within receiver 26. By differencing this measurement with the time of reception, as determined by a clock in receiver 26, the pseudo range between the receiver and the satellite being tracked is determined. This pseudo range includes both the range to the satellite and the offset of the receiver's clock from the GPS master time reference. The pseudo range measurements and navigation data from four satellites are used to accurately compute the latitude and longitude position of the bow mounted GPS antenna in a selected geographic coordinate system.

The boat's bow position data is then provided as a navigational message over data line 46 (1200 baud) to a system interface module 48. The navigational messages are provided in standard National Marine Electronics Association (NMEA) format. Similarly, NMEA formatted signals from a digital flux gate compass 23 indicating the trolling motor's heading are provided over data line 50 (4800 baud) to interface module 48. Digital compass 23 is a programmable Azimuth Model C100 compass, available from KVH Industries, Inc., Middletown, R.I., which includes the feature of automatically converting the magnetic heading to the true digital heading. Interface module 48 passes the signals from DGPS receiver 26 and compass 23, via RS-232 serial data lines 54, 56 to a computer 58, an IBM compatible personal computer having dual serial ports and a parallel printer port. Note that the positional and heading signals from DGPS receiver 28 and compass 23, respectively, may have been provided directly to computer 58; however, because interface module 48 provides power supply signals to both receiver 28 and compass 23, passing the positional and heading signals through interface module 48 simplifies the wiring between the components.

Computer 58 uses the positional and heading information to calculate range and bearing data for moving the boat toward the desired anchoring site. More specifically, the range and the rate of change of the range are calculated in the form of digital thruster power signals while the heading and bearing information are used to calculate digital thruster steering signals. The digital thruster power signals are sent back, via data line 59, to interface module 48 over the parallel printer port of computer 58 where they are converted using D/A converters into analog signals for driving a bow thruster motor 24. Digital thruster steering signals are similarly converted by interface module 48 and provided to steering servo 60 which controls the steering direction of motor 24. Bow thruster motor 24 is a commercially available trolling motor, Model 812 Turbo Pro A, manufactured by MinnKota Electric Fishing Motors, Mankota, Minn., which has been modified by adding a slip-ring assembly 62, Model AC4023, available from Litton Poly-Scientific, Blacksburg, Va. Slip-ring assembly 62 allows motor 24 to fully rotate about the axis of a shaft 63 which connects the steering servo 60 to the thruster motor while maintaining the electrical connection between the motor and the power source. The built-in compass auto pilot in the Model 812 trolling motor is not used.

Figure 3:
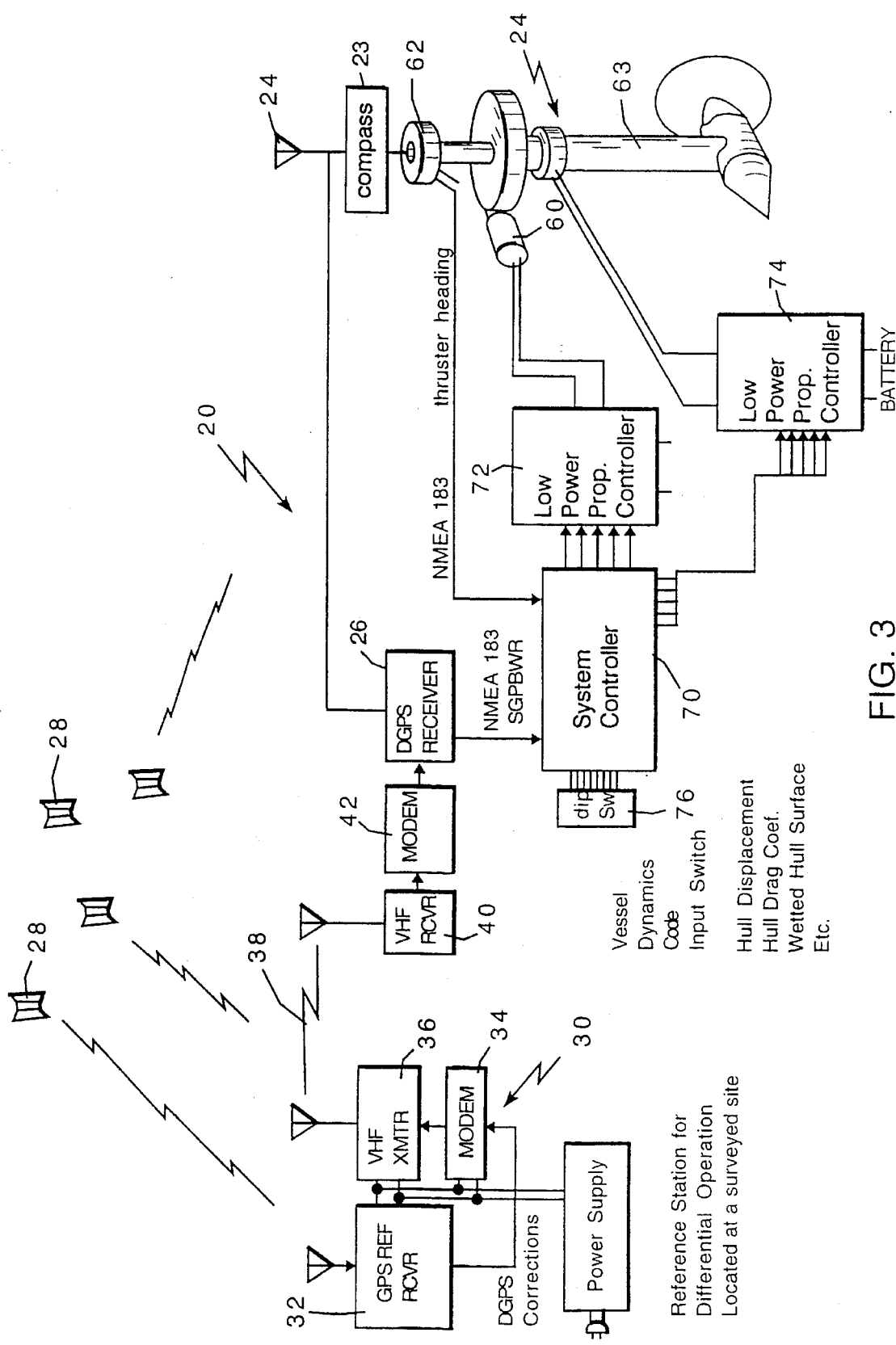
FIG. 3 is a block diagram of an alternative version of the anchorless boat positioning system.

The use of computer 58 provides the operator with a large degree of flexibility in receiving signals and generating signals in various formats and for different types of motors depending on, for example, the size of the boat. In a preferred embodiment, however, shown in FIG. 3, interface module 48 and computer 58 can be replaced with a system controller 70 and associated propeller controller circuits 72, 74. Certain commercially available programmable microcomputer controllers used in industrial process applications may be used for this application. Similarly, off-the-shelf circuits which provide digital/analog conversion may be used for propeller controller circuits 72, 74. It is appreciated that one of skill in the art, would be able to select suitable circuitry to fulfill the system requirements. Controller 70 uses the positional and heading information provided from receiver 26 and compass 23, respectively, to calculate range and bearing data in the form of thruster power and steering signals. Switches 76 connected to controller 70 offer the operator the ability to switch between several different modes of operation that are generally dependent on the size of the boat and thruster, as well as prevailing sea conditions. The size of the boat influences the magnitude and duration of thrust signals needed to initiate movement of the boat and to compensate for the momentum once the boat has started moving. Others characteristics related to the physical configuration of the boat such as, for example, the hull displacement, hull drag coefficient, and wetted hull surface area of the boat also effect the mode of operation chosen. Sea conditions, such as, wind and water currents, are also a large variable effecting the mode of operation selected.

Figure 4:
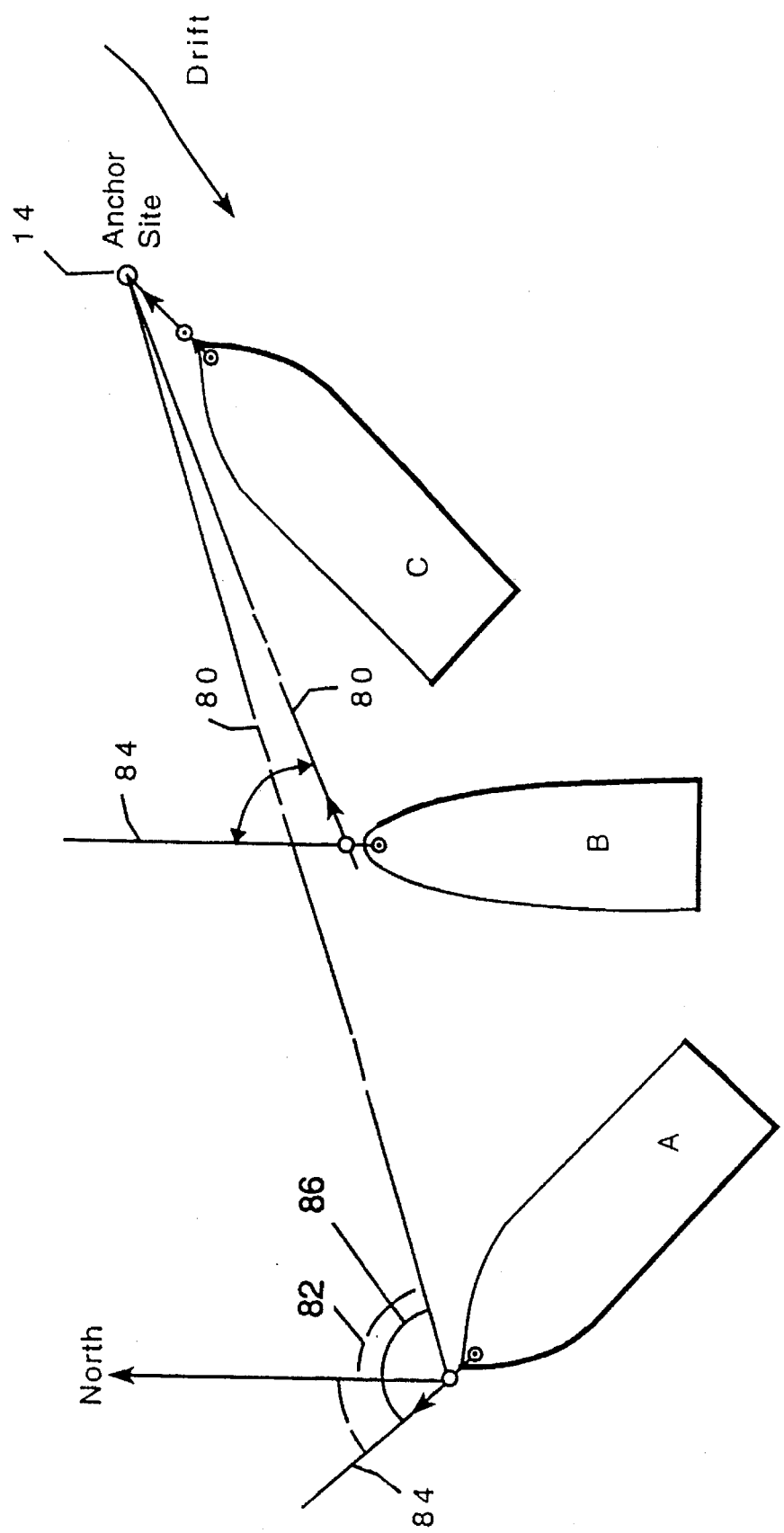
FIG. 4 is a diagrammatic sketch showing the repositioning of a floating boat in accordance with the invention.
Figure 5B:
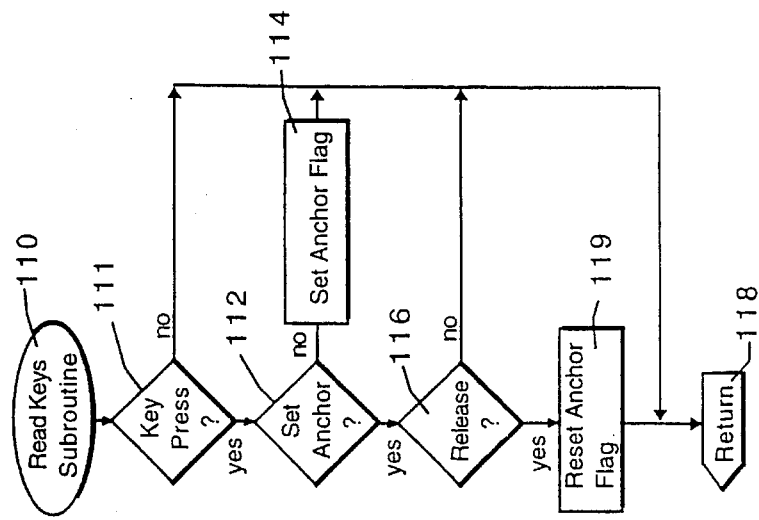
FIGS. 5A and 5B are flow diagrams for maintaining the position of the boat using the system of FIG. 1.
Figure 5A:
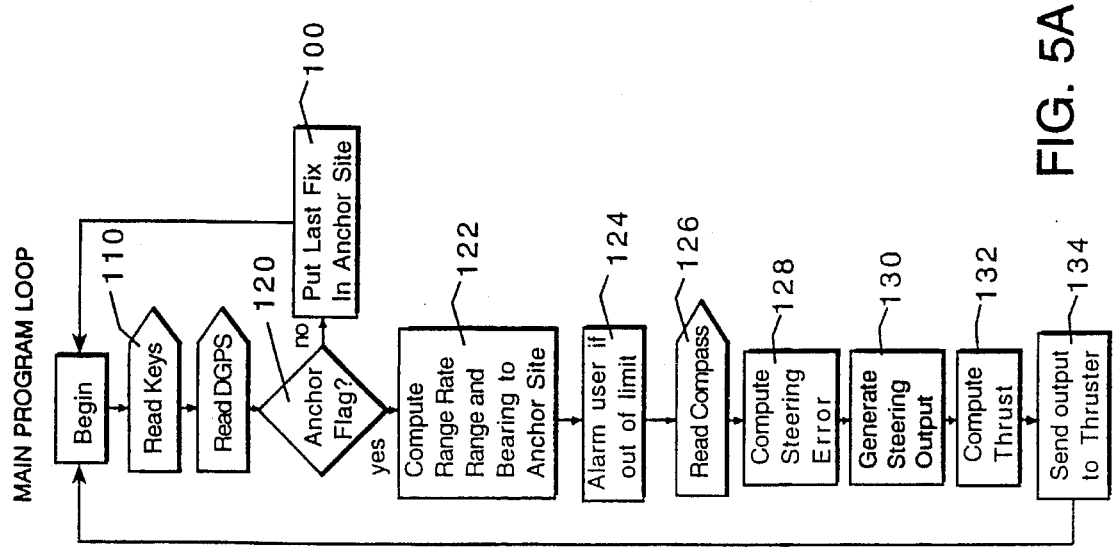

Referring to the diagram of FIG. 4 and the flow diagrams of FIGS. 5A and 5B, the operation of the anchorless positioning system is described. The operator of boat 10 having selected anchor site 14 as his desired anchor position simply depresses a button switch located on the console within the cabin to activate the system.

A computer program written in Turbo C++ Programming Language, a product of Borland International, Inc., Scotts Valley, Calif., uses information provided from receiver 26 and compass 23 to generate signals for controlling motor 24. Source code software for implementing the system is included as a microfiche appendix. The program includes a buffer which is continuously updated with the present position of the boat, even when the boat is not anchored. When the operator selects a desired anchoring position, the positional data in the buffer is stored (100). Further, the program includes a subroutine READ KEYS (110) to constantly monitor the state of the switch (111). Because button switches are used to both activate and deactivate the system, subroutine READ KEYS uses an anchor flag constantly monitor whether the system is in an activated or deactivated state (112). If the anchor flag has not been previously set (anchor position not established) the anchor flag is set (114). On the other hand, if the flag has previously been set, subroutine READ KEYS determines (116) whether the anchor position is to be maintained, whereupon it returns (118) to the main program loop, or if the system is to be deactivated the anchor flag is reset (119).

In this example, as shown in FIG. 4, the system anchor flag is set to establish the position of boat 10 at anchor site 14. Because anchorless positioning system continuously monitors the boat's position every second, the allowed amount of drift from anchor site 14 would normally be small. In order to better describe the system's operation, however, it is assumed that the boat has drifted an exaggerated distance from anchor site 14 to a position A. Receiver 26 monitors, in one second intervals, the boat's current differential GPS latitudinal and longitudinal position and generates the navigational messages to computer 58. The latitudinal and longitudinal position information is provided with resolution where each minute (1/60 of a degree) is expressed to four decimal places. If the anchor flag has been set (120) the program computes the range 80 (the distance between boat 10 and anchoring site 14) and bearing 82 (the direction to the anchoring site with respect to direction north). Using the DGPS coordinates of the anchor site stored in the computer's memory and the DGPS coordinates of the present position of the boat (122). The rate of the change of range is also calculated to determine the proper thrust of the motor in proportion to the velocity of the boat. In this way, a steadier and more uniform movement toward the anchor site is achieved. An alarm, preferably an audible signal, is activated to alert the operator that a malfunction in the system prevents the anchorless positioning system from properly maintaining the anchor site (124). The angular difference between the heading of the trolling motor and magnetic north, referred to as the thruster heading 84 is measured at one tenth of a second intervals using compass 23 (126) with an accuracy of ±1 degree and sent as navigation messages to computer 58. The program calculates the steering error 86 (118) using the thruster heading 84 and the bearing 82 to anchoring site 14 and generates steering signals (130) for driving servo 60 (FIG. 3) which rotates motor 24 and redirects boat 10 toward anchor site 14. The program then uses the range and rate of change of range information to generate the thrust signals (132) to control the amount of thrust driving motor 24 (134). The steering and thruster output signals are generated at one second intervals to progressively close in from position A to position B and on to position C, the desired anchoring position established by the operator. In this embodiment, motor 24 is a variable speed motor that is modulated to vary the magnitude of the thrust applied by the motor. The program provides fifteen incremental levels of increasing thrust.

In this example, the selected anchoring location is defined only by the positional data received by GPS receiver 26, with the boat eventually becoming positioned by the wind and sea currents with its bow pointed in opposition to the disturbing forces. However, it is appreciated that in certain situations, (e.g., mooring) it may be desired to fix the orientation of the boat at the selected anchoring site. In these circumstances, the desired heading of the boat is indicated by a separate digital magnetic compass and is stored at the time the anchoring location is established so that the program provides thrust control and steering control signals which maintain not only the position but also the heading of the boat. In this way, the boat's stern is not allowed to freely rotate about the anchoring location.

When it is desired to "pick up anchor" and move on, the operator simply depresses a button switch to reset the anchor flag.

A second small electric motor mounted perpendicular to the keel, controlled directly by a magnetic compass, may be attached to the stern of the boat to provide small bursts of thrust, forward or reverse, in the heading direction to help in maintaining the heading of the boat. Because a tendency exists for the boat to "fishtail" as the motor 24 works to maintain the bow position at the anchoring location, this second motor provides a right or left force to maintain the boat's heading, thereby minimizing the fishtail effect and reducing drift.

Figure 6:
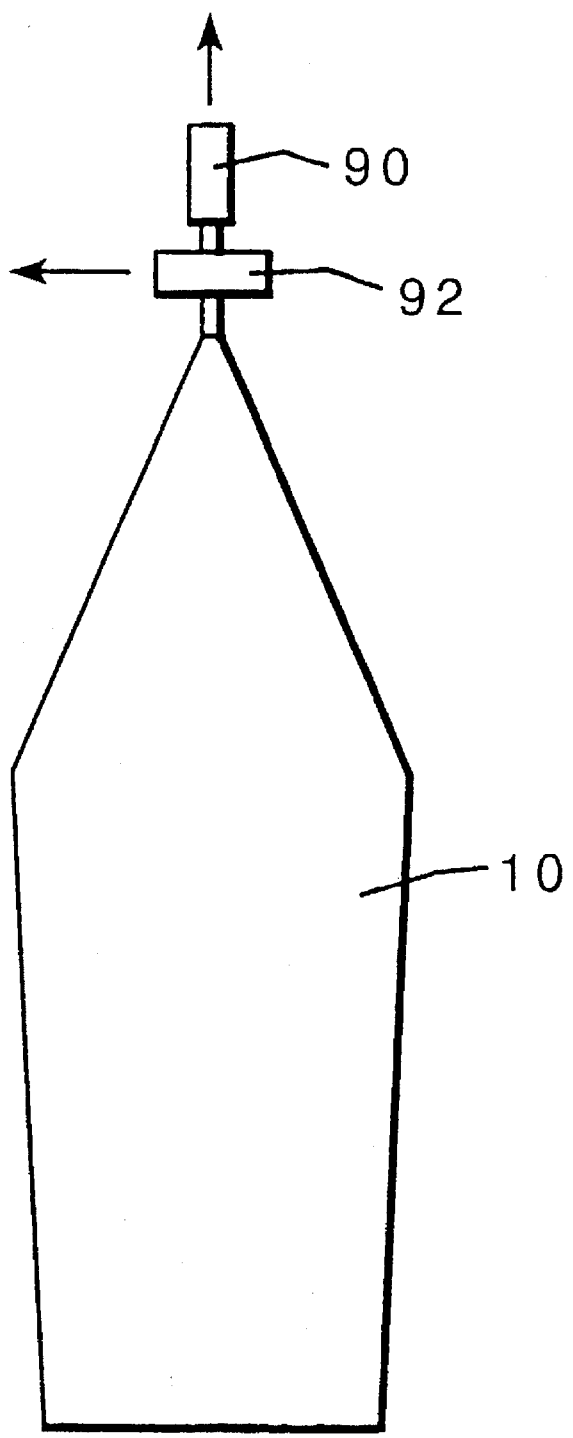
FIG. 6 is a top view of another embodiment of an anchorless boat positioning system.

Referring to FIG. 6, a variation of the anchorless positioning system uses a pair of non-rotating thruster motors 90, 92 fixed in stationary alignment to the bow of the boat. More particularly, motor 90 is positioned to propel the boat in a direction along the long axis of the boat with thruster motor 92 positioned transverse to that of motor 90. The amount of thrust generated by each of the motors is controlled by signals provided by the system controller so that thruster motor 90 controls the boat's heading to maintain its alignment with the anchor site, while thruster motor 92 propels the boat to the anchor site.

In other embodiments, steerable thrusters or motors, of the type described above in conjunction with FIGS. 1–5, may be positioned at both the bow and stern of the boat to provide anchoring while preventing rotation of the boat. Using such an arrangement allows, for example, anchorless mooring of the boat at a pier without the use of cables. Each thruster may be associated with its own GPS receiver or may use a single receiver on a time-sharing basis. Alternatively, the system may be used in conjunction with an angular resolver so that the position of the stern is in a fixed relationship with the position of the thruster motor at the bow.

Other variations and modifications are within the scope of the following claims. For example, on larger vessels, with larger drift inducements, the main propulsion system of the vessel may be utilized to provide part of the correcting force needed. In other words, when the heading of the boat is substantially that of the heading of the thruster, the main propulsion motor of the vessel provides assistance, in a complementary fashion, in propelling the boat toward the desired anchoring location.

A portion of the disclosure of this patent document contains material which is subjected to copyright protection. The copyright owner has no objection to the facsimile reproduction by anyone of the patent document or patent disclosure, as it appears in the Patent and Trademark Office file or records, but otherwise reserves all copyright rights whatsoever.

What is claimed is:

1. A system for substantially maintaining the position of a boat at an anchoring location in water selected by an operator of the boat, the system comprising:

at least one thruster, attached to a vertical shaft mounted to the boat and driven by a power source, for moving the boat to the selected anchoring location within the water;

a DGPS capable receiver located on-board the boat for receiving signals from GPS satellites and differential correction signals from another source, the DGPS capable receiver providing position information signals indicative of the position of the thruster in a differential GPS mode of operation based on said signals from the GPS satellites and the differential correction signal source, a digital solid state compass for providing current heading indication signals representative of the heading of the thruster at less than about one second intervals;

said DGPS capable receiver generating range, bearing, magnitude and rate of change in range information at about one second intervals or faster on the basis of the difference between the selected position and present position of the thruster, a controller providing control signals to the thruster for steering and propelling the boat to the selected anchoring location, the control signals related to the range, bearing, magnitude and rate of change in range information, said control signals including a variable thrust signal whose magnitude is dependent on the direction, magnitude and rate of change in range; and a slip-ring assembly for allowing the thruster to rotate unrestricted multiple revolutions and without limit about the axis of the shaft while maintaining electrical connection between the thruster and the power source.

2. The system of claim 1 wherein the at least one thruster comprises a single thruster fully rotatable about a vertical axis extending from above the surface of the water to below the surface of the water and transverse to the direction of propulsion of the single thruster.

3. The system of claim 2 wherein the control signals include thrust control signals for propelling the single thruster and steering control signals for rotating the single thruster.

4. The system of claim 2 wherein the single thruster is attached to the bow of the boat.

5. The system of claim 4 further comprising a second thruster positioned at the stern of the boat for propelling the boat in the direction of the boat's heading.

6. The system of claim 1 wherein the digital solid state compass provides a heading indication signal representative of the heading of the thruster toward the selected location and the control signals relate to the difference between position information and heading indication signals received at the selected location and position information and heading indication signals received at a present location.

7. The system of claim 1 further comprising a second digital solid state compass for providing a second heading indication signal representative of the heading of the boat, with the control signals provided to the thruster further relating to the difference between a second heading indication signal received at the selected location and a second heading signal received at the present location.

8. The system of claim 1, wherein said controller amplifies the magnitude of the variable thrust signal as a function of the range and velocity away from the selected location and reduces the magnitude of the variable thrust signal as a function of the range and velocity toward the selected location.

9. The system of claim 8, wherein the function describing the magnitude of the thrust signal can be expressed at least in part substantially as follows:

range * K1–rangerate * K2, wherein K1 and K2 are independently adjustable constants and rangerate is velocity toward or away from, depending on its sign, the selected location.

10. A method of substantially maintaining a position of a point on a boat at an anchoring location in water selected by an operator, the boat including a steerable thruster connected vertical shaft mounted to a boat and driven by a power source, the method comprising the steps of:

providing an on-board DGPS capable receiver on the boat and a digital solid state compass on the thruster to indicate the thruster's current heading at less than about one second intervals, modifying the thruster by providing a slip-ring assembly for allowing the thruster to rotate unrestricted multiple revolutions and without limit about the axis of the shaft while maintaining electrical connection between the thruster and the power source;

receiving and storing position information signals from GPS satellites and differential correction signals from another source with the on-board DGPS capable receiver to establish positional coordinates of a selected anchoring location in a differential GPS mode of operation, receiving, at about one second intervals or less, position information signals from the GPS satellites and the differential correction signal source with the on-board DGPS capable receiver to determine a present location of the steerable thruster and a present heading indication of the steerable thruster from the digital solid state compass, determining a range, bearing, magnitude and rate of change in range from a present location of the boat to the selected anchoring location on the basis of the difference between the selected and present position of the thruster, determining the direction of the rate of change in range at the present location, and controlling the magnitude and direction of the thrust of the thruster on the basis of the range, bearing, and rate of change in range from the present location to the selected location and the direction of the rate of change in range, the magnitude of the thrust being dependent on the direction of the change in range.

11. The method of claim 10 wherein the receiving and storing step further comprises:

receiving and storing, from a second digital solid state compass, a heading indication of the boat at the selected anchoring location.

12. A system for substantially maintaining the position of a boat at a selected location in water, the system comprising:

a thruster, attached to a vertical shaft mounted to the boat and driven by a power source, for maintaining the boat at the selected location within the water;

receiving means, located on-board the boat, for receiving signals from the GPS satellites and differential correction signals from another source, and for providing position information signals indicative of the position of the thruster in a differential GPS mode of operation;

means for providing a heading indication signal representative of the heading of the thruster;

said receiving means generating range, bearing, magnitude and rate of change in range information on the basis of the difference between the selected and present position of the thruster at about one second intervals or less, and controller means providing control signals to the thruster for steering and propelling the boat to the selected location, the control signals related to the range, bearing, magnitude and rate of change in range information, said control signals including a variable thrust signal dependent on the direction of the rate of change in range; and means for allowing the thruster to rotate unrestricted multiple revolutions and without limit about the axis of the shaft while maintaining electrical connection between the thruster and the power source.

\* \* \* \* \*